(12) United States Patent
Jiang et al.

(10) Patent No.: US 10,088,603 B2
(45) Date of Patent: Oct. 2, 2018

(54) SILOXANE NANOPARTICLE COATING USEFUL FOR ANTIREFLECTION

(71) Applicant: 3M INNOVATIVE PROPERTIES COMPANY, St. Paul, MN (US)

(72) Inventors: Xuan Jiang, Maplewood, MN (US); Naiyong Jing, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 220 days.

(21) Appl. No.: 15/103,209

(22) PCT Filed: Dec. 1, 2014

(86) PCT No.: PCT/US2014/067931
§ 371 (c)(1),
(2) Date: Jun. 9, 2016

(87) PCT Pub. No.: WO2015/088808
PCT Pub. Date: Jun. 18, 2015

(65) Prior Publication Data
US 2016/0306077 A1    Oct. 20, 2016

Related U.S. Application Data

(60) Provisional application No. 61/914,410, filed on Dec. 11, 2013.

(51) Int. Cl.
*B32B 9/04* (2006.01)
*G02B 1/118* (2015.01)
(Continued)

(52) U.S. Cl.
CPC ............ *G02B 1/118* (2013.01); *C03C 17/007* (2013.01); *C09D 5/006* (2013.01); *C09D 7/61* (2018.01);
(Continued)

(58) Field of Classification Search
CPC .......... C09D 7/61; C09D 7/63; C09D 183/08; C09D 5/006; C03C 17/007;
(Continued)

(56) References Cited

U.S. PATENT DOCUMENTS

| 4,530,879 A | 7/1985 | Drahnak |
| 4,600,484 A | 7/1986 | Drahnak |

(Continued)

FOREIGN PATENT DOCUMENTS

| EP | 1181256 | 2/2002 |
| JP | 4278875 | 12/2002 |

(Continued)

OTHER PUBLICATIONS

Khramov, "Nanostructured sol-gel derived conversion coatings based on epoxy-and amino-silanes", Progress in Organic Coatings, 2003, vol. 47, pp. 207-213.

(Continued)

*Primary Examiner* — William K Cheung
(74) *Attorney, Agent, or Firm* — Carolyn A. Fischer (57) ABSTRACT

A method of making a coated article is described comprising providing an inorganic substrate and coating the substrate with a coating composition. The coating composition comprises a plurality of siloxane nanoparticles dispersed in an organic solvent. A portion of the nanoparticles comprise the reaction product of a first alkoxy silane compound having a first organofunctional group and a second organofunctional group of a second compound and the reaction between the first and second organofunctional groups form an organic linking group. The method further comprises drying the coating composition and heating the coated substrate to volatilize the organic linking groups thereby forming a porous surface layer on the inorganic substrate. In another embodiment an article is described comprising an inorganic (Continued)

Comparative Example substrate, such as glass, and a porous inorganic (e.g. silica) surface layer having an average pore size of less than 30 nm. Also described are coating compositions and methods of making a nanoparticle coating compositions.

20 Claims, 2 Drawing Sheets (51) Int. Cl.
| | |
|---|---|
| *C03C 17/00* | (2006.01) |
| *C09D 183/08* | (2006.01) |
| *C09D 5/00* | (2006.01) |
| *C09D 7/61* | (2018.01) |
| *C09D 7/63* | (2018.01) |
| *C08G 77/14* | (2006.01) |
| *C08G 77/26* | (2006.01) |
| *C08K 3/28* | (2006.01) |
| *C08K 5/5333* | (2006.01) |

(52) U.S. Cl.
CPC .............. *C09D 7/63* (2018.01); *C09D 183/08* (2013.01); *C03C 2217/425* (2013.01); *C03C 2217/45* (2013.01); *C03C 2218/113* (2013.01); *C08G 77/14* (2013.01); *C08G 77/26* (2013.01); *C08K 3/28* (2013.01); *C08K 5/5333* (2013.01); *G02B 2207/101* (2013.01)

(58) Field of Classification Search
CPC .......... C03C 2217/425; C03C 2217/45; C03C 2218/113; G02B 1/118; G02B 2207/101; C08G 77/14; C08G 77/26; C08K 5/5333; C08K 3/28

USPC ........................................................ 428/447
See application file for complete search history.

(56) References Cited

U.S. PATENT DOCUMENTS

| | | | |
|---|---|---|---|
| 5,800,926 | A | 9/1998 | Nogami |
| 6,177,131 | B1 | 1/2001 | Glaubitt |
| 2006/0099407 | A1 | 5/2006 | Wang |
| 2008/0305302 | A1 | 12/2008 | Weng |
| 2012/0192762 | A1 | 8/2012 | Yabe |
| 2013/0196140 | A1 | 8/2013 | Lewis |
| 2016/0002097 | A1* | 1/2016 | Schmidt ................ C03C 17/007 428/328 |

FOREIGN PATENT DOCUMENTS

| | | |
|---|---|---|
| JP | 2009-040967 | 2/2009 |
| WO | WO 2009-140482 | 11/2009 |
| WO | WO 2010-017069 | 2/2010 |
| WO | WO 2011002838 | 1/2011 |
| WO | WO 2013-188083 | 12/2013 |
| WO | WO 2013-188121 | 12/2013 |

OTHER PUBLICATIONS

International Search for PCT International Application No. PCT/US2014/067931, dated Feb. 20, 2015, 4 pages.

* cited by examiner

Fig. 3

SILOXANE NANOPARTICLE COATING USEFUL FOR ANTIREFLECTION

CROSS REFERENCE TO RELATED APPLICATIONS

This application is a national stage filing under 35 U.S.C. 371 of PCT/US2014/067931, filed Dec. 1, 2014, which claims the benefit of U.S. Provisional Application No. 61/914,410, filed Dec. 11, 2013 the disclosure of which is incorporated by reference in their entirety herein.

SUMMARY

In one embodiment, a method of making a coated article is described comprising providing an inorganic substrate and coating the substrate with a coating composition. The coating composition comprises a plurality of siloxane nanoparticles dispersed in an organic solvent. A portion of the nanoparticles comprise the reaction product of a first alkoxy silane compound having a first organofunctional group and a second organofunctional group of a second compound and the reaction between the first and second organofunctional groups form an organic linking group. The method further comprises drying the coating composition and heating the coated substrate to volatilize the organic linking groups thereby forming a porous surface layer on the inorganic substrate.

In another embodiment an article is described comprising an inorganic substrate, such as glass, and a porous inorganic (e.g. silica) surface layer having an average pore size of less than 30, 25, 20, 15, 10, or 5 nm.

In another embodiment, a coating composition is described comprising siloxane nanoparticles dispersed in an organic solvent wherein a portion of the siloxane nanoparticles are the reaction product of a first alkoxy silane compound having a first organofunctional group and a second organofunctional group of a second compound and the reaction between the first and second organofunctional groups forms an organic linking group.

The coating comprises siloxane nanoparticles having the general formula:

$[(R_4O)_m—Si—R_5-L^1]_p-L^2$ wherein $R_4$ is independently hydrogen or a silicon atom of a siloxane segment;
$R_5$ is alkylene, arylene, or alkarylene;
m=1 to 3;
p=1 to 3; and
$-L^1-L^2-$ is the reaction product of the first and second organofunctional groups.

In another embodiment, a method of making a nanoparticle coating composition is described comprising providing a mixture comprising an organic solvent; a first alkoxy silane compound having a first organofunctional group; a second compound having a second organofunctional group that reacts with the first organofunctional group forming an organic linking group; and no greater than 40 wt-% solids of alkoxy silane compounds that lack organofunctional groups or partial hydrolysis products thereof. The method further comprises combining the mixture with acid and water wherein the water to alkoxy silane molar ratio is no greater than 7:1 and hydrolyzing the mixture to form a coating composition.

DETAILED DESCRIPTION

The present invention pertains to methods of making siloxane nanoparticle coating compositions, coating compositions comprising siloxane nanoparticles, methods of making a porous (e.g. antireflective) coated article, and articles comprising the dried and/or sintered coating compositions described herein.

The method of making the nanoparticle coating composition comprises providing a mixture comprising an organic solvent and alkoxy silane compounds. The organic solvent is typically an alcohol such as ethanol, methanol propanol, isopropanol, n-butanol, 1-methoxy-2-propanol, ethylene glycol monoalkyl ether, propylene glycol monoalkyl ether, and mixtures thereof. The coating compositions typically comprise at least 70, 80, 85, or 90 wt-% or greater of organic solvent (e.g. alcohol) based on the total coating composition.

The mixture comprises a first alkoxy silane compound having a first organofunctional group; a second compound having a second organofunctional group the reacts with the first organofunctional group forming an organic linking group. In typical embodiments, the mixture further comprises no greater than 40 wt-% solids of alkoxy silane compounds that lack organofunctional groups or partial hydrolysis product thereof.

The invention will be described in greater detail herein with reference to an alkoxy silane compound with amine functionality as a representative preferred first alkoxy silane compound having a first organofunctional organic group. The second compound will be described herein with reference to a compound having epoxy functionality as a representative preferred second compound. In some embodiments, the second compound is an alkoxy silane compound having epoxy functionality. In other embodiments, the second compound is an epoxy compound having epoxy functionality, yet lacking an alkoxy silane group.

Suitable alkoxy silanes typically have the following chemical formula:

wherein $R^1$ is independently an alkyl;
$R_5$ is alkylene, arylene, or alkarylene; and
m ranges from 1 to 3, and is typically 2 or 3.

In some embodiments, $R_5$ is $(CH_2)_n$ wherein n ranges from 0 to 12, or n ranges from 0 to 3, or n is 2 or 3.

In some embodiments, $R^1$ is preferably alkyl comprising 1 to 6, more preferably 1 to 4 carbon atoms, even more preferably $R^1$ is independently selected from the group consisting of methyl, ethyl, propyl, butyl, and acetyl, still more preferably from the group consisting of methyl and ethyl;

In the case of alkoxy silane compounds having epoxy functionality, Y comprises an epoxide terminal group such as epoxycyclohexyl, glycidyl, and glycidyloxy. Such Y groups that comprise epoxide terminal groups may be defined as $Y^2$.

Suitable epoxy silanes for use herein include, but are not limited to, 2-(3,4-epoxycyclohexyl) ethyltrimethoxysilane; 2-(3,4-epoxycyclohexyl) ethyltriethoxysilane; (3-glycidoxypropyl) trimethoxysilane; (3-glycidoxypropyl) triethoxysilane; and mixtures thereof.

In the case of alkoxy silane compounds having amine functionality, Y comprises an amine terminal group such as in the case of $—NH—CH_2—CH_2—NR^2R^3$, $—NR^2R^3$ with R² and R³ being independently selected from the group consisting of H, alkyl, phenyl, benzyl, cyclopentyl and cyclohexyl. Such Y groups that comprise amine terminal groups may be defined as Y'.

Suitable alkoxy silane compounds having amine functionality for use herein include, but are not limited to amino-substituted organosilane ester or ester equivalent that bear on the silicon atom at least one, and preferably 2 or 3 ester or ester equivalent groups. Ester equivalents are known to those skilled in the art and include compounds such as silane amides (RNR'Si), silane alkanoates (RC(O)OSi), Si—O—Si, SiN(R)—Si, SiSR and RCONR'Si compounds that are thermally and/or catalytically displaceable by R"OH. R and R' are independently chosen and can include hydrogen, alkyl, arylalkyl, alkenyl, alkynyl, cycloalkyl, and substituted analogs such as alkoxyalkyl, aminoalkyl, and alkylaminoalkyl. R" may be the same as R and R' except it may not be H. These ester equivalents may also be cyclic such as those derived from ethylene glycol, ethanolamine, ethylenediamine and their amides.

Another such cyclic example of an ester equivalent is

In this cyclic example R' is as defined in the preceding sentence except that it may not be aryl. 3-aminopropyl alkoxysilanes are well known to cyclize on heating and these RNHSi compounds would be useful in this invention. Preferably the amino-substituted organosilane ester or ester equivalent has ester groups such as methoxy that are easily volatilized as methanol. The amino-substituted organosilane must have at least one ester equivalent; for example, it may be a trialkoxysilane.

For example, the amino-substituted organosilane may have the formula (Z2N-L-SiX'X"X'"), wherein

Z is hydrogen, alkyl, or substituted aryl or alkyl including amino-substituted alkyl; and L is a divalent straight chain C1-12 alkylene or may comprise a C3-8 cycloalkylene, 3-8 membered ring heterocycloalkylene, C2-12 alkenylene, C4-8 cycloalkenylene, 3-8 membered ring heterocycloalkenylene or heteroarylene unit; and each of X', X" and X'" is a C1-8 alkyl, halogen, C1-8 alkoxy, C1-8 alkylcarbonyloxy, or amino group, with the proviso that at least one of X', X", and X'" is a labile group. Further, any two or all of X', X" and X'" may be joined through a covalent bond. The amino group may be an alkylamino group.

L may be divalent aromatic or may be interrupted by one or more divalent aromatic groups or heteroatomic groups. The aromatic group may include a heteroaromatic. The heteroatom is preferably nitrogen, sulfur or oxygen. L is optionally substituted with C1-4 alkyl, C2-4 alkenyl, C2-4 alkynyl, C1-4 alkoxy, amino, C3-6 cycloalkyl, 3-6 membered heterocycloalkyl, monocyclic aryl, 5-6 membered ring heteroaryl, C1-4 alkylcarbonyloxy, C1-4 alkyloxycarbonyl, C1-4 alkylcarbonyl, formyl, C1-4 alkylcarbonylamino, or C1-4 aminocarbonyl. L is further optionally interrupted by —O—, —S—, —N(Rc)-, —N(Rc)-C(O)—, —N(Rc)-C(O)—O—, —O—C(O)—N(Rc)-, —N(Rc)-C(O)—N(Rd)-, —O—C(O)—, —C(O)—O—, or —O—C(O)—O—. Each of Rc and Rd, independently, is hydrogen, alkyl, alkenyl, alkynyl, alkoxyalkyl, aminoalkyl (primary, secondary or tertiary), or haloalkyl;

Examples of amino-substituted organosilanes include 3-aminopropyltrimethoxysilane (SILQUEST A-1110), 3-aminopropyltriethoxysilane (SILQUEST A-1100), 3-(2-aminoethyl)aminoprop-yltrimethoxysilane (SILQUEST A-1120), SILQUEST A-1130, (aminoethylaminomethyl) phenethyltrimethoxysilane, (aminoethylaminomethyl)-phenethyltriethoxysilane, N-(2-aminoethyl)-3-aminopropylmethyldimethoxysilane (SILQUEST A-2120), bis-(.gamma.-triethoxysilylpropyl)amine (SILQUEST A-1170), N-(2-aminoethyl)-3-aminopropyltributoxysilane, 6-(aminohexylaminopropyl)trimethoxysilane, 4-aminobutyltrimethoxysilane, 4-aminobutyltriethoxysilane, p-(2-aminoethyl)phenyltrimethoxysilane, 3-aminopropyltris(methoxyethoxyethoxy)silane, 3-aminopropylmethyldiethoxysilane, oligomeric aminosilanes such as DYNASYLAN 1146, 3-(N-methylamino)propyltrimethoxysilane, N-(2-aminoethyl)-3-aminopropylmethyldimethoxysilane, N-(2-aminoethyl)-3-aminopropylmethyldiethoxysilane, N-(2-aminoethyl)-3-aminopropyltrimethoxysilane, N-(2-aminoethyl)-3-aminopropyltriethoxysilane, 3-aminopropylmethyldiethoxysilane, 3-aminopropylmethyldimethoxysilane, 3-aminopropyldimethylmethoxysilane, 3-aminopropyldimethylethoxysilane, and the following cyclic compounds:

A bis-silyl urea [RO)₃Si(CH₂)NR]₂C=O is another example of an amino-substituted organosilane ester or ester equivalent.

In some embodiments, the alkoxy silane having amine functionality is 3-aminopropyltrimethoxysilane.

In the case of alkoxy silane compounds that lack (e.g. amine or epoxy) functionality, such alkoxy silanes generally have the chemical formula:

$$R^2Si(OR^1)_m$$

wherein $R^1$ is independently alkyl as previously described; $R^2$ is independently hydrogen, alkyl, aryl, alkaryl, or $OR^1$; and m ranges from 1 to 3, and is typically 2 or 3 as previously described.

Suitable alkoxy silanes of the formula $R^2Si(OR^1)_m$ include, but are not limited to tetra-, tri- or dialkoxy silanes, and any combinations or mixtures thereof. Representative alkoxy silanes include propyltrimethoxysilane, propyltriethoxysilane, butyltrimethoxysilane, butyltriethoxysilane, pentyltrimethoxysilane, pentyltriethoxysilane, heptyltrimethoxysilane, heptyltriethoxysilane, octyltrimethoxysilane, octyltriethoxysilane, dodecyltrimethoxysilane, dodecyltriethoxysilane, hexadecyltrimethoxysilane, hexadecyltriethoxysilane, octadecyltrimethoxysilane, octadecyltriethoxysilane, phenyltrimethoxysilane, phenyltriethoxysilane dimethyldimethoxysilane and dimethyldiethoxysilane.

Preferably, the alkyl group(s) of the alkoxy silanes comprises from 1 to 6, more preferably 1 to 4 carbon atoms. Preferred alkoxysilanes for use herein are selected from the group consisting of tetra methoxysilane, tetra ethoxysilane, methyl triethoxysilane, dimethyldiethoxysilane, and any mixtures thereof. A preferred alkoxysilane for use herein comprises tetraethoxysilane (TEOS). The alkoxy silane lacking organofunctional groups utilized in the method of making the coating composition may be partially hydrolyzed, such as in the case of partially hydrolyzed tetramethoxysilane (TMOS) available from Mitsubishi Chemical Company under the trade designation "MS-51".

In some embodiments, the coating composition typically comprises no greater than 45, 40, 35, or 30 mole % of alkoxy silane compounds that lack (e g amine or epoxy) organofunctional groups, such as compounds of the formula $R^2Si(OR^1)_m$. In some embodiments, the concentration of alkoxy silane compounds that lack amine or epoxy functionality, such as compounds of the formula $R^2Si(OR^1)_m$, is at least 5, 10, or 15 mole % and in some embodiments at least 20, 21, 22, 23, 24, or 25 mole %.

In some embodiments, the balance of the alkoxy silanes of the coating composition are the alkoxy silane compounds having organofunctional groups such as epoxy and amine groups. The alkoxy silane compounds having first (e.g. amine) functional groups and second (e.g. epoxy) functional groups are typically present at a molar concentration ranging from about 1:1 to about 1:3.

In other embodiments, an epoxy compound lacking an alkoxy silane group is utilized in place of (or in combination with) the alkoxy silane compound having epoxy functionality. One illustrative epoxy compound is trimethylolpropane triglycidyl ether.

In one embodied method of making the coating composition, the alkoxy silane compounds and epoxy compound when present are sufficiently diluted in an organic solvent (e.g. alcohol) and combined with acid and water.

The amount of water added during the method is at least a stoichiometric amount equal to the total reactive alkoxy silane groups (Si—$OR^1$ groups, wherein $R^1$ alkyl). The ratio of water to alkoxy silane reactive groups typically does not exceed 7:1. In preferred embodiments, the ratio of water to alkoxy silane reactive groups is no greater than 6:1, 5:1, 4:1, 3:1, 2:1, or 1.5:1. The water may be added in one batch or in several steps. In the absence of water, hydrolysis does not occur. When the concentration of water is too high the solution becomes unstable, opaque (cloudy), and the coating uniformity can be poor.

The acid utilized typically has a pKa ($H_2O$) of less than 5, 4.5 or 4. Useful acids for use herein include both organic and inorganic acids and may be exemplified by acetic acid (4.75), oxalic acid (1.23 and 4.19), citric acid (3.08 and 4.74), $H_2SO_3$, $H_3PO_4$, $CF_3CO_2H$, HCl, HBr, HI, $HBrO_3$, $HNO_3$, $HClO_4$, $H_2SO_4$, $CF_3SO_3H$, $CF_3CO_2H$, and $CH_3SO_2OH$. Aromatic acids such as benzoic acid may also be utilized. In some embodiments, a mixture of an organic and inorganic acid is utilized.

The alkoxy silane compounds, organic solvent (e.g. alcohol), water and acid are combined by mixing such components. The hydrolysis reaction can generally occur at temperature between −20 and 130° C. In some embodiments, the hydrolysis reaction occurs at room temperature (e.g. 20-25° C.). In other embodiments, the hydrolysis reaction occurs at a temperature of at least 30, 40, or 50° C. in a reactor. Preferably, the reaction is conducted in a closed container or under reflux, so that no evaporation or volatilization of the liquid from the reactor occurs. Such hydrolysis reaction forms siloxane nanoparticles dispersed in the organic solvent that is useful as a coating composition.

In some embodiments, all of the starting compounds are present at the commencement of the hydrolysis (polycondensation). However, the water concentration is typically lower than the amount that was added since water is consumed during the hydrolysis. Further, the coating composition is acidic, typically having a pH ranging from 1 to 6 and in some embodiments a pH of 4 to 5.

The alkoxy silane groups react with water (hydrolyze) to form silanol groups. The silanol groups also react with each other forming siloxane segments and a siloxane network. Further, due to the (e.g. concurrent) inclusion of sufficient concentrations of alkoxy silane compounds having first and second organofunctional groups, the organofunctional groups react (covalently bond) with each other forming organic linking groups.

When the siloxane nanoparticle is the reaction product of at first alkoxy silane compound having a first organofunctional group, $Y^1$, and a second alkoxy silane compound, having a second organofunctional group, $Y^2$, a portion of the siloxane nanoparticles have the general formula:

wherein $R_4$ is hydrogen or a silicon atom of a siloxane segment;
$R_5$ is alkylene, arylene, or alkarylene;
m=1 to 3;
p=1 to 3; and
-$L^1$-$L^2$- is the reaction product of the first and second organofunctional groups.

When p is 1 and $R_4$ is hydrogen, such siloxane nanoparticles can have an elongated linear structure prior to sintering). When p is 2 or 3 and $R_4$ is hydrogen, the siloxane nanoparticles have a radial, branched, structure with three or four branches prior to sintering.

One representative reaction product, siloxane particle, or segment of a siloxane network is depicted as follows, wherein $R_4$ is independently hydrogen or a silicon atom of a siloxane segment.

When the siloxane nanoparticle is the reaction product of at first alkoxy silane compound having a first organofunctional group, $Y^1$, and a second epoxy compound lacking an epoxy silane group, having a second organofunctional group $Y^2$, a portion of the siloxane nanoparticles have the general formula:

$$[(R_4O)_m-Si-R_5-L^1]_p-L^2$$

wherein $R_4$ is independently hydrogen or a silicon atom of a siloxane segment;
$R_5$ is alkylene, arylene, or alkarylene;
m=1 to 3;
p=1 to 3; and
$-L^1-L^2-$ is the reaction product of the first and second organofunctional groups.

When $R_4$ is hydrogen and p is 1 or 2, the siloxane nanoparticles also have an elongated linear structure. Further when p is 3, the siloxane nanoparticles have a radial, branched, structure with three branches prior to sintering.

One representative reaction product, siloxane particle, or segment of a siloxane network is depicted as follows, wherein $R_4$ is independently hydrogen or a silicon atom of a siloxane segment.

no greater than 1000, 900, 800, 700, 600, 500 g/mole. The molecular weight of the organic linking group $-L^1-L^2$ is typically at least 50 or 100, or 150 g/mole. In some embodiments, the molecular weight is less than 200, 190, or 180 g/mole. The molecular weight of the organic linking group in the dried coating can be determined with conventional techniques.

Without intending to be bound by theory it is surmised that the organic linking group $L^1-L^2$ can control the spacing between the siloxane particles and segments in the dried coating. Utilizing an organic linking group derived from the organofunctional group can also result in a predictable pore size and uniformly dispersed pores in the sintered coating.

The average particle diameter of the siloxane nanoparticles in the coating solution can be determined using Field Emission Scanning Electron Microscopy (FE-SEM) or Transmission Electron Microscopy (TEM) techniques.

The siloxane nanoparticle containing dispersion may be used directly as a coating composition. If desired, the The organic linking group $-L^1-L^2-$ comprises carbon, hydrogen, as well as other residues of the organofunctional group from which is was formed. For example, when the first functional group in an amine, the organic linking group $-L^1-L^2-$ comprises nitrogen. In some embodiments, the nitrogen content of the dried (but not sintered) nanoparticle coating ranges from 0.5 to 10 wt-%. In some embodiments, the nitrogen content contributed by the organofunctional group is no greater than 5, 4 or 3 wt-%. However, the inclusion of aluminum nitrate to improve the durability can also contribute to the total nitrogen content.

The organic linking group $-L^1-L^2$ has a calculated molecular weight based on the selection of $Y^1$ and $Y^2$ of no greater than 2000 or 1500 g/mole. In typical embodiments, the molecular weight of the organic linking group $L^1-L^2$ is dispersion may be concentrated or diluted to obtain a coating composition. Further, a different solvent may be substituted or added to obtain a coating composition.

In some embodiments, the coating composition does not contain any (e.g. preformed) silica nanoparticles or other (e.g. preformed) inorganic oxide nanoparticles. Further, the method of preparing the coating composition generally does not comprise adding organic polymer such as (e.g. colloidal) organic polymer (e.g. particles). Thus, the coating is free of such organic polymer.

In some embodiments, the coating composition further comprises an aluminum compound to improve the durability. Useful aluminium compound having good solubility in alcohol include aluminum salts such as $AlCl_3.6H_2O$, $Al(NO_3)_3 \cdot 9H2O$, $Al(ClO_3)_3$, $Al(ClO_4)_3$, $Al(-OOCR)_3$, wherein $R=C_1-C_{16}$ and $Al(OR)_3$, wherein $R=C_1-C_4$.

In some embodiments, the coating composition comprises an aluminum compound in combination with an organophosphorus compound. Organophosphorus compounds are degradable containing carbon-phosphorus bonds (thus excluding phosphate and phosphite esters, organic compounds which lack this kind of bonding). In some embodiments, the organophosphorus compound is a phosphonate esters having the general structure $P(=O)(OR)_3$. In other embodiments, the organophosphorus compound is an ester of phosphonic acid having the general formula $RP(=O)(OR')_2$ wherein R is $C_1-C_{12}$ and R' is $C_1-C_4$; and salts thereof.

One representative phosphonates ester compound is dimethyl methyl phosphonate

The siloxane nanoparticle dispersion described herein are shelf stable, meaning that the coating does not gel, opacify (become cloudy), or otherwise deteriorate after 1 month at 50° C.

The siloxane nanoparticle coating compositions are preferably coated on the substrate using conventional techniques, such as bar, roll, curtain, rotogravure, spray, dip coating, spin coating, brush coating techniques. The substrate can be treated to improve adhesion between the substrate and the siloxane nanoparticle coating layers as described above, using, e.g., chemical treatment, corona treatment such as air or nitrogen corona, plasma, flame, flash lamp treatment or actinic radiation.

The dried siloxane nanoparticle coating or porous surface layer typically has an average thickness of at least 75 or 100 nm. In some embodiments, the thickness of the dried siloxane nanoparticle coating or porous surface layer is no greater than 500 nm or 400 nm. When the porous surface layer is utilized for antireflection, the coating thickness is chosen to maximize the transmission properties.

After coating and drying the coating composition, the coated substrate is subjected to a heat treatment to volatilize the organic linking group $L^1$-$L^2$ and any other organic components that are present in the dried coating composition. The heat treatment temperature is typically at least 300° C. or 350° C. However, higher temperatures can be used provided that the substrate is sufficiently heat resistant. For example, glass substrates can be heated to 500-700° C. In this embodiment, the heating may concurrently temper the glass.

Figure 2:
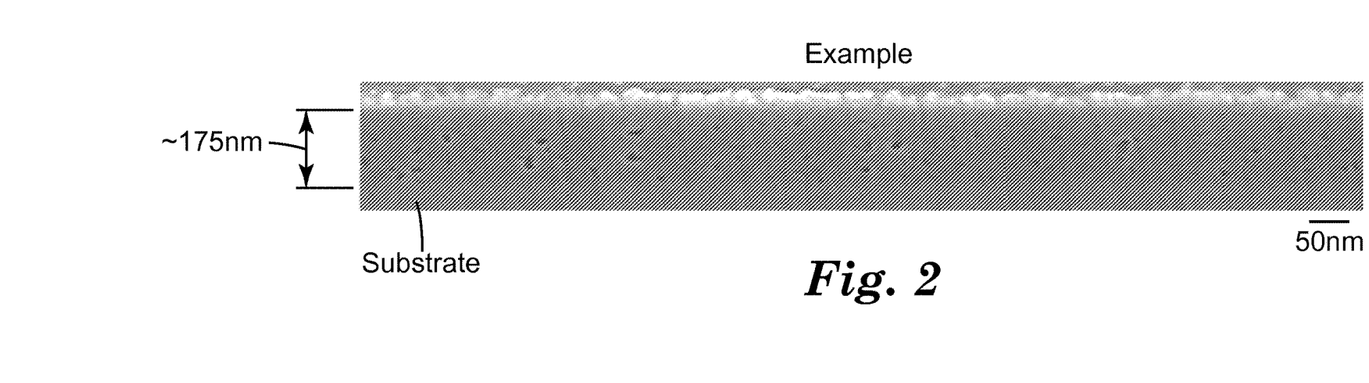
FIG. 2 is a cross-section of an illustrative dried and sintered coating according to the present invention at a magnification of 100× comprising smaller dark colored pores.
Figure 3:
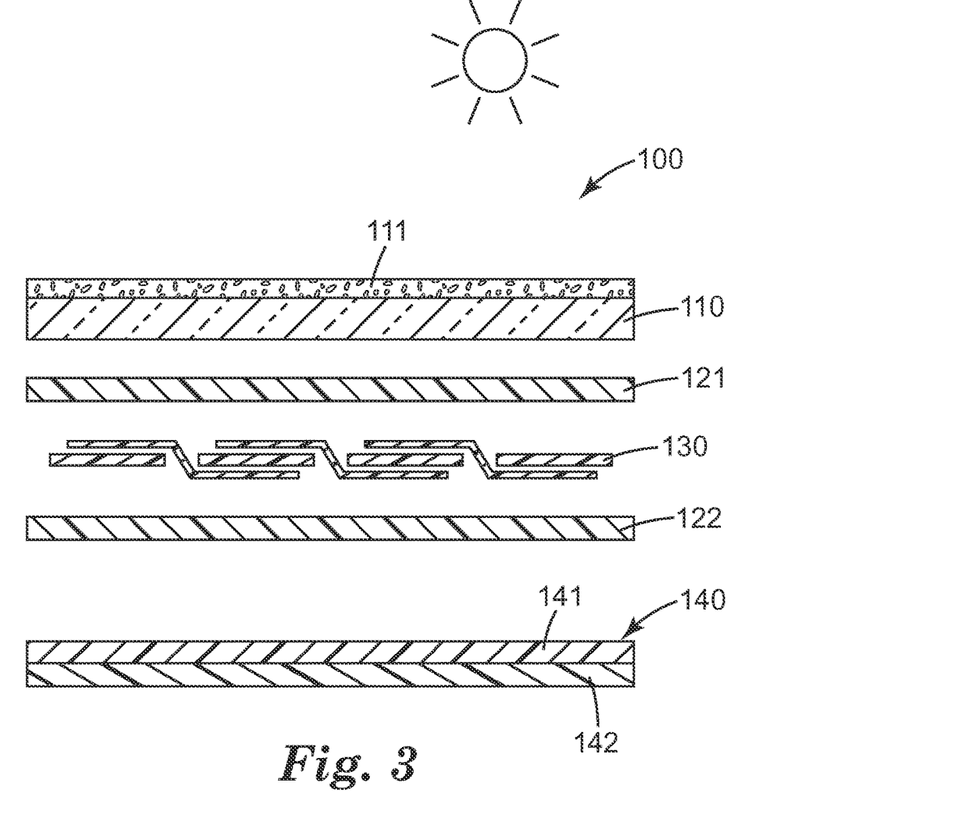
FIG. 3 is a schematic cross-section of a photovoltaic cell.

The volatilization of the organic linking groups $L^1$-$L^2$ produces a void typically filled with gas such as air, thereby forming a porous surface layer. The pore size is a function of the size of the organic linking groups $L^1$-$L^2$ and thus the selection of $Y^1$ and $Y^2$ as previously described. In some embodiments, the porous coating has an average pore size of less than 50, 45, 40, 35, 30, 25, 20, 15, 10, or 5 nm. With reference to FIG. 2, the minimum pore size can be difficult to detect even at a magnification of 100×. However, the minimum pore size can be determined at higher magnification levels and is typically at least about 1 nm. The pore size derived from the organic linking group can also be calculated.

In favored embodiments, the substrate is an inorganic material such as glass, ceramic, an organic and inorganic composite material, metal, and any combinations thereof.

Typically the substrate is in the form of a sheet, panel or pane of material and may be a part of an article such as glass for liquid crystal displays, instrument panels, eye glasses, windshields, windows and photovoltaic cell module. The siloxane nanoparticle coatings may cover only a portion of the article. The substrate may be flat, curved or shaped.

Preferably, the substrate and the substrate comprising the porous coating described herein is transparent or translucent to visible light. This specific execution may find particular use when the coating assembly is meant to be applied or coated as an overlaminate coating on various substrates. Alternatively, such as in the case of coating opaque composition materials the coating not need to be transparent and may be completely opaque.

When the coating assembly is applied to a transparent substrate to achieve increased light transmissivity, the coated article preferably exhibits a total average increase in transmissivity of normal incident light of at least 1.5% up to 4%, depending on the substrate coated, over a range of wavelengths extending between 380 to 1100 or the sub-range 600-800 nm. Preferred coating compositions applied to at least one side of a light transmissive substrate increase the percent transmission of the substrate by at least 1.5, 2, 2.5, 3, 3.5 percent over a range of wavelengths extending between 380 to 1100 or the sub-range 600-800 nm.

The dried and sintered coating comprising an aluminum compound optionally in combination with an organophosphorus compound can exhibit improved durability as can be determined by the Salt Bath Test and Linear Taber Abrasion Test as further described in the forthcoming examples. In typical embodiments, the average transmission for wavelengths ranging from 380 to 1100 nm is substantially the same or slightly greater after being evaluated with such tests. Further, the average transmission is typically at least 2.0, 2.5, 3.0, 3.5, or 4% after being evaluated with such tests.

Figure 1:
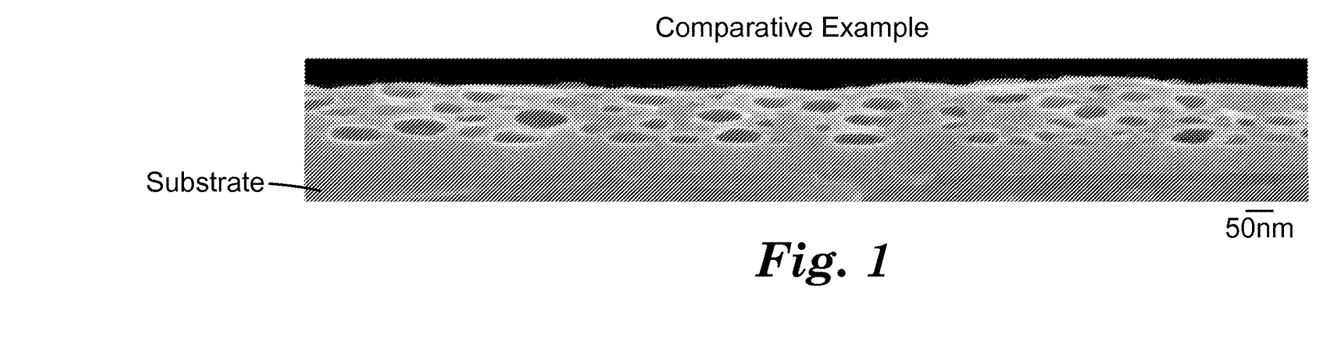
FIG. 1 is a microphotograph of a cross-section of a Comparative Example of a commercially available antireflective coating on glass comprising pores as darker circular portions.

In some embodiments, glass having the dried and volatized coating composition as described herein is useful in photovoltaic modules that convert solar energy to electrical energy. With reference to FIG. 1, a typical construction for a photovoltaic module 100 includes a thick layer of glass 110 as a glazing material. The glass protects solar cells comprising crystalline silicon wafers and wires 130 that are embedded in a moisture resisting plastic sealing (e.g. encapsulant) compound 121, and 122 such as cross-linked ethylene vinyl acetate. The dried and volatilized coating composition described herein is typically applied to the surface of glass 111 that is exposed to the environment. However, the coating can optionally (not shown) be applied to the opposing surface of the glass. Typically 130 includes two wafers of doped silicon (p-type and n-type) in contact to form a junction with each wafer having an electrical connection. As an alternative to crystalline silicon wafers and wires, thin film solar cells can be applied from various semiconductor materials, such as CIGS (copper-indium-gallium-selenide), CTS (cadmium-tellurium-sulfide), a-Si (amorphous silicon) and others on a carrier sheet which is also jacketed on both sides with encapsulant materials (121, 122). The encapsulant 122 is bonded to a backsheet 140. Fluoropolymer coated films 140 are useful for such backsheet. In one embodiment, the polymeric substrate film is a polyester 141, and in a more specific embodiment, a polyester selected from the group consisting of polyethylene terephthalate, polyethylene naphthalate and a coextrudate of polyethylene terephthalate/polyethylene naphthalate. In one embodiment the polymeric substrate is a heat sealable film such as 3M™ Scotchpak™ Heat Sealable Polyester Film that comprises PET combined with olefinic polymers such as ethylene vinyl acetate (EVA). Polyester provides electrical insulation and moisture barrier properties, and is an economical component of the backsheet. A dried fluoropolymer coating or fluoropolymer film can form the outer layer 142 that is typically exposed to the environment. In another embodiment, (not shown) both surfaces of the polymeric substrate film 141 are coated with fluoropolymer creating a sandwich of polyester between two layers of coating of fluoropolymer. In some embodiments, the fluoropolymer layer may be bonded directly to the (e.g. EVA) encapsulant. Fluoropolymer films provide excellent strength, weather resistance, UV resistance, and moisture barrier properties to the backsheet.

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

EXAMPLES

Materials:

Tetraethoxyl silane (TEOS), 99+%, (3-aminopropyl) trimethoxysilane (APS), 97%, and 1-methoxy-2-propanol (MeO-IPA) were obtained from Alfa Aesar (Ward Hill, Mass.).

3-Glycidoxypropyl trimethoxysilane (GPS), 3-(acryloyloxy) propyltrimethoxysilane (AOPS), were obtained from Alfa Aesar (Ward Hill, Mass.).

2-(3,4-Epoxycyclohexyl) ethyltrimethoxysilane (ECES), was obtained from Alfa Aesar (Ward Hill, Mass.).

Methyl triethoxysilane (MTEOS), 98%, was obtained from TCI CO., LTD (Tokyo, Japan)

COATOSIL-1770, 2-(3,4-Epoxycyclohexyl)ethyltriethoxysilane, was obtained from Momentive Performance Materials (Friendly, W. Va.) under trade designation "CoatOSIL 1770".

Trimethylolpropane triglycidyl ether (TMPTGE), 99%, was obtained from Aldrich Chemical Company (Milwaukee, Wis.).

4-Vinyl-1-cyclohexane 1,2-epoxide (VCE), was obtained from Aldrich Chemical Company (Milwaukee, Wis.).

Cyclohexene oxide (CHO), was obtained from Aldrich Chemical Company (Milwaukee, Wis.).]

Isopropanol (IPA) was purchased from VWR International (West Chester, Pa.).

Aluminum Nitrate, 9-hydrate, $Al(NO_3)_3 \cdot 9H_2O$ crystal (AlN), and hydrogen peroxide ($H_2O_2$), 30% aqueous, were purchased from J. T. Baker (Pillipsburg, N.J.).

Octanoic acid (OA), 99%, dimethyl methylphosphonate (DMMP), 97%, were obtained from Aldrich Chemical Company (Milwaukee, Wis.).

Method for Forming Antireflective (AR) Coatings:

Flat glass substrates, obtained from CSG Holding Co. Ltd., China, under trade designation "SOLITE", were cleaned with AJAX cleaning powder (commercially available from Colgate Palmolive Company, New York, N.Y.) by scrubbing with a sponge and subsequently rinsing off with tap water and then with deionized (DI) water. The cleaned samples were then stored in DI water ready for use.

The cleaned glass substrates were then coated on their smooth side with coating solutions prepared according to the Examples and Comparative Examples described below by dip coating. In order to obtain single side coated glass substrate, the wet coating film on the textured side was wiped off by using IPA soaked paper towel. Then the extra IPA was wiped off with a dry paper towel.

The coated samples were dried at room temperature and heated to 700° C. for 2~3 minutes and cooled to room temperature. The heating also tempered the glass. The heating volatilized the organic component producing a porous inorganic surface layer on the glass. The porous inorganic surface layer of Example 20 is depicted in FIG. 2. All the testing was conducted on the (sintered) porous inorganic surface layer.

Method for Determining $\Delta T_{380-1100}$ and $\Delta T_{600-800}$:

The transmission spectra of blank and coated samples were measured with a Lambda 1050 Perkin-Elmer spectrophotometer from 380 to 1100 nm. The enhancement of transmission by the AR coating was evaluated by comparing the average difference between coated and blank spectra in the 3801100 nm range ($\Delta T_{380-1100}$) and in the 600800 nm range ($\Delta T_{600-800}$).

Method for Salt Bath Test:

The coated samples were immersed in an aqueous 5 wt % NaCl solution for a week, then cleaned with DI water. The resulting samples were allowed to air dry before transmission and mechanical property measurements.

Method for Linear Taber Abrasion Test:

Linear Taber abrasion tests were carried out by using crock cloth patches with 1140 g/sq·cm pressure for 400 cycles Taber Abraser 5750, obtained from Taber Industries, North Tonawanda, N.Y.)) on coated area. Then the tested samples were rinsed with DI water for 10 sec to remove the debris from abrasion, and dried. Transmission data were measured after abrasion test, water rinse and drying.

Examples 1-6 (EX1-EX6) and Comparative Examples A-B (CEXA-CEXB)

EX1 coating solution was prepared by first adding to an 8 oz (237 mL) glass jar 35 g IPA and 60 g 1-methoxy-2-propanol. To the solution was added 3.5 g of a mixture of COATOSIL 1770 and APS at 62:38 weight ratio (1:1 molar ratio) and 1.5 g of TEOS. The weight ratio of COATOSIL 1770/APS:TEOS was about 70/30. The amount of COATOSIL 1770, APS and TEOS, collectively, in the MEO-IPA solution was 5 wt. %. This was followed by the addition of 2 g of DI water and a couple of drops of acetic acid. The clear mixture solution was stirred overnight at 70° C. (~16 hrs). The solution turned slightly hazy after hydrolysis and was ready for AR coating use. The shelf life of the coating solution was determined by allowing the solution stand at 50° C. Coated glass substrates were prepared as described above and the $\Delta T_{380-1100}$ and $\Delta T_{600-800}$ were determined.

EX2-EX6 and CEXA-CEXB were prepared in the same manner as EX1 except that the coating solution composition was varied as described in Table 1, below. Table 1, below summarizes the composition, and shelf life of the coating solutions and the $\Delta T_{380-1100}$ and $\Delta T_{600-800}$ of the resulting coated glass samples.

TABLE 1

| EX | Reactant | Reactant Composition (% weight ratio) APS | TEOS | Shelf Life @ 50° C. (days) | $\Delta T_{380-1100}$ | $\Delta T_{600-800}$ |
|---|---|---|---|---|---|---|
| EX2 | GPS | 42 28 | 30 | 6 | 2.51 | 3.03 |
| EX3 | AOPS | 40.6 29.4 | 30 | 6 | 1.73 | 2.06 |
| EX4 | ECES | 43.4 26.6 | 30 | 13 | 2.05 | 2.48 |
| EX5 | VCE | 42 28 | 30 | 16 | 1.5 | 1.51 |
| EX6A | CHO | 42 28 | 30 | 16 | 1.73 | 1.71 |
| EX6B | TMPTGE | 26.2 46.7 | 27.1 | | 1.91 | 2.06 |

Examples 7-17 EX7-EX17

EX7-EX17 were prepared in the same manner as EX1 except that the weight ratio of COATOSIL 1770/APS: TEOS, the amount of DI water added, hydrolysis temperature and time were varied as summarized in Table 2, below. Table 2, below summarizes the composition, and hydrolysis conditions as well as the $\Delta T_{380-1100}$ and $\Delta T_{600-800}$ of the resulting coated glass samples for EX7-EX17.

TABLE 2

| EX | Wt. ratio of COATOSIL 1770/APS: TEOS | DI Water (g) | Hydrolysis Conditions T (° C.) | T (days) | Observations | $\Delta T_{380-1100}$ | $\Delta T_{600-800}$ |
|---|---|---|---|---|---|---|---|
| EX7 | 90:10 | 2 | 50 | 8 | None | 2.13 | 2.26 |
| EX8 | 80:20 | 2 | 50 | 8 | None | 2.04 | 2.35 |
| EX9 | 70:30 | 2 | 50 | 5 | None | 2.97 | 3.40 |
| EX10 | 60:40 | 2 | 50 | 2 | Haze | 2.60 | 3.25 |
| EX11 | 50:50 | 2 | 50 | 1 | Cloudy | 3.01 | 3.78 |
| EX12 | 70:30 | 1 | 50 | 5 | None | 2.27 | 2.93 |
| EX13 | 70:30 | 5 | 50 | 1 | Slight haze | 2.92 | 3.33 |
| EX14 | 70:30 | 10 | 50 | 1 | Haze | 2.37 | 2.84 |
| EX15 | 70:30 | 2 | 20 | 14 | None | 3.08 | 3.86 |
| EX16 | 70:30 | 2 | 70 | 2 | None | 3.14 | 3.75 |
| EX17A | 70:30 | 2 | 80 | 1 | None | 2.95 | 3.56 |
| EX17B | 70:30 (MTEOS) | 2 | 80 | 1 | None | 2.52 | 2.86 |

Note that EX7-EX9 solutions exhibited good shelf life at 50° C. and did not precipitate or gel even after 3 months. EX10 solution was stable for 4 weeks and EX11 solution gelled after 2 days.

With increasing the amount of DI water during the hydrolysis, the solution became quite hazier and coating uniformity from the solution was not good. The ideal amount of DI water in 100 g coating solution was within 2~5 g. By increasing the hydrolysis temperature, the solution could be prepared in much shorter time (2 days @ 70° C. compared to 14 days @ 20° C.) without sacrificing the AR performance and coating uniformity.

Examples 18-21 EX18-EX21

EX18-EX21 were prepared in the same manner as EX1 except after the hydrolysis of the EX1 coating solutions, a mixture of AlN (10 wt. % solution in water), IPA and OA were added dropwise in to the EX1 coating solution. The resulting mixture was stirred at 50° C. overnight. EX20 and EX21 were prepared by a further addition of DMMP. The coating composition of EX18-EX21 samples are summarized in Table 3, below. The resulting coating solutions of EX18-EX21 as well as EX1 were coated on glass substrates and the $\Delta T_{380-1100}$ and $\Delta T_{600-800}$ of the resulting coated glass samples were determined as prepared and after salt bath and linear Taber abrasion testing. The results are summarized in Table 4, below.

TABLE 3

| Example | Amount of EX1 solution (g) | Amount of AlN solution (g) | Amount of IPA (g) | Amount of OA (g) | Amount of DMMP (g) |
|---|---|---|---|---|---|
| EX18 | 95 | 2.5 | 2.5 | 1 | 0 |
| EX19 | 90 | 5 | 5 | 2 | 0 |
| EX20 | 90 | 5 | 5 | 2 | 0.5 |
| EX21 | 90 | 5 | 5 | 2 | 1 |

TABLE 4

| Example | As prepared coating $\Delta T_{380-1100}$ | $\Delta T_{600-800}$ | After Salt Bath Test $\Delta T_{380-1100}$ | $\Delta T_{600-800}$ | After Taber Abrasion Test $\Delta T_{380-1100}$ | $\Delta T_{600-800}$ |
|---|---|---|---|---|---|---|
| EX1 | 3.14 | 3.75 | Coating destroyed | Coating destroyed | N/M | N/M |
| EX18 | 2.84 | 3.23 | 2.96 | 3.03 | 1.05 | 1.04 |
| EX19 | 2.96 | 3.09 | 2.99 | 3.40 | 2.55 | 3.17 |
| EX20 | 3.23 | 3.40 | 3.12 | 3.52 | 3.05 | 3.74 |
| EX21 | 3.22 | 3.76 | 3.20 | 3.82 | 2.33 | 2.96 |

N/M means not measured

The salt corrosion resistance and durability of AR coatings were greatly improved by introducing Al salt into the system. With increasing amounts of aluminum salt in the coating, the AR transmission increase value remained essentially unchanged.

Furthermore, the addition of DMMP along with aluminum salt further improved the corrosion resistance and mechanical durability of the AR coatings. But the shelf-life time of coating solutions became shorter, compared with the solutions without DMMP.

Examples 22-28 EX22-EX28

EX22-EX28 were prepared in the same manner as EX1 except that during the hydrolysis of the coating solutions of EX1, 0.5 g of DMMP (for EX22) or 1 g of DMMP was added (for EX23-EX28) for each 100 g of EX1 solution. Then a mixture of AlN (10 wt. % solution in water for EX22-EX25 or 20 wt. % solution in water for EX26-EX28), IPA, and OA were added dropwise in to the hydrolyzed EX1 coating solution with the added DMMP. The resulting mixture was stirred at 50° C. overnight. The coating composition of EX22-EX28 samples are summarized in Table 5, below. The resulting coating solutions of EX22-EX28 were coated on glass substrates and the $\Delta T_{380-1100}$ and $\Delta T_{600-800}$ of the resulting coated glass samples were determined as prepared and after salt bath and linear Taber abrasion testing. The results are summarized in Table 6, below.

TABLE 5

| Example | Amount of EX1 solution with DMMP(g) | Amount of AlN solution (g) | Amount of IPA (g) | Amount of OA (g) |
|---|---|---|---|---|
| EX22 | 102.5 | 5 | 5 | 2 |
| EX23 | 105 | 5 | 5 | 2 |
| EX24 | 105 | 7.5 | 7.5 | 1.5 |
| EX25 | 105 | 10 | 8 | 2 |
| EX26 | 105 | 3.75 | 3.75 | 1.5 |
| EX27 | 105 | 4 | 4 | 1.6 |
| EX28 | 105 | 4.5 | 4.5 | 1.8 |

TABLE 6

| Example | As prepared coating $\Delta T_{380-1100}$ | $\Delta T_{600-800}$ | After Salt Bath Test $\Delta T_{380-1100}$ | $\Delta T_{600-800}$ | After Taber Abrasion Test $\Delta T_{380-1100}$ | $\Delta T_{600-800}$ |
|---|---|---|---|---|---|---|
| EX22 | 3.38 | 3.76 | 3.64 | 4.09 | 3.09 | 3.53 |
| EX23 | 3.33 | 3.68 | 3.60 | 3.96 | 2.98 | 3.30 |
| EX24 | 3.16 | 3.60 | 3.52 | 4.10 | 2.98 | 3.39 |
| EX25 | 3.35 | 3.85 | 3.47 | 4.00 | 3.17 | 3.64 |
| EX26 | 3.09 | 3.56 | 3.35 | 3.89 | 2.83 | 3.36 |

TABLE 6-continued

| Example | As prepared coating $\Delta T_{380-1100}$ | $\Delta T_{600-800}$ | After Salt Bath Test $\Delta T_{380-1100}$ | $\Delta T_{600-800}$ | After Taber Abrasion Test $\Delta T_{380-1100}$ | $\Delta T_{600-800}$ |
|---|---|---|---|---|---|---|
| EX27 | 3.00 | 3.44 | 3.28 | 3.80 | 3.04 | 3.55 |
| EX28 | 3.03 | 3.57 | 3.36 | 3.94 | 2.66 | 3.45 |

Examples 29-32 EX29-EX32

EX29-EX32 were prepared in the same manner as EX27 except 0.1, 0.2, 0.3, and 0.4 g, respectively, of an $H_2O_2$ solution was added to the coating solution of EX27. The resulting coating solutions of EX29-EX32 were coated on glass substrates and the $\Delta T_{380-1100}$ and $\Delta T_{600-800}$ of the resulting coated glass samples were determined as prepared and after salt bath and linear Taber abrasion testing. The results are summarized in Table 7, below.

TABLE 7

| Example | As prepared coating $\Delta T_{380-1100}$ | $\Delta T_{600-800}$ | After Salt Bath Test $\Delta T_{380-1100}$ | $\Delta T_{600-800}$ | After Taber Abrasion Test $\Delta T_{380-1100}$ | $\Delta T_{600-800}$ |
|---|---|---|---|---|---|---|
| EX29 | 3.00 | 3.45 | 3.55 | 4.13 | 3.19 | 3.96 |
| EX30 | 3.05 | 3.52 | 3.75 | 4.29 | 3.35 | 4.05 |
| EX31 | 3.09 | 3.60 | 3.35 | 3.94 | 2.53 | 3.32 |
| EX32 | 2.85 | 3.39 | 3.41 | 4.07 | 2.93 | 3.73 |

What is claimed is:

1. A method of making a coated article comprising:
   providing an inorganic substrate;
   coating the substrate with a coating composition comprising a plurality of siloxane nanoparticles dispersed in an organic solvent wherein a portion of the nanoparticles comprise the reaction product of a first alkoxy silane compound having a first organofunctional group and a second organofunctional group of a second compound and the reaction between the first and second organofunctional groups form an organic linking group;
   drying the coating composition;
   heating the coated substrate to volatilize the organic linking groups thereby forming a porous surface layer on the inorganic substrate.

2. The method of claim 1 wherein the coating composition is free of organic polymer.

3. The method of claim 1 wherein the second compound is an alkoxy silane compound.

4. The method of claim 1 wherein the second compound is an organic compound that lacks an alkoxy silane group.

5. The method of claim 1 wherein the first organofunctional group is an alkoxy silane compound having amine functionality.

6. The method of claim 1 wherein the second organofunctional group comprises epoxy functionality.

7. The method of claim 1 wherein the porous coating has an average pore size of less than 50 nm.

8. The method of claim 1 wherein the porous coating has a refractive index ranging from 1.22 to 1.38.

9. The method of claim 1 wherein the substrate is glass and the heating concurrently tempers the glass.

10. A coating composition comprising siloxane nanoparticles dispersed in an organic solvent wherein a portion of the siloxane nanoparticles have the general formula:

$$(R_4O)_m—Si—R_5-L^1-[L^2-R_5—Si—(O—R_4)_m]_p; \text{ or}$$

$$[(R_4O)_m—Si—R_5-L^1]_p-L^2$$

wherein $R_4$ is independently hydrogen or a silicon atom of a siloxane segment;
$R_5$ is alkylene, arylene, or alkarylene;
m=1 to 3;
p=1 to 3; and
$-L^1-L^2-$ is the reaction product of the first and second organofunctional groups.

11. The coating composition of claim 10 wherein the siloxane nanoparticles have an elongated linear structure or a branched structure.

12. The coating composition of claim 10 wherein $-L^1-L^2-$ comprises carbon and nitrogen.

13. The coating composition of claim 12 wherein the dried coating composition comprises 0.5 to 10 wt-% nitrogen.

14. The coating composition of claim 10 wherein the coating composition further comprises siloxane particles having the general formula:

$$R^2Si(OR_4)_m$$

wherein $R_4$ is independently hydrogen or a silicon atom of a siloxane segment;
$R^2$ is independently hydrogen, $R^1$, or $OR^1$, and
m=1 to 3.

15. The coating composition of claim 10 wherein the coating composition further comprises an aluminum salt, optionally in combination with an organophosphorous compound.

16. An article comprising a substrate and the dried coating composition of claim 10 disposed on a surface of the substrate.

17. An article comprising the dried and sintered coating composition of claim 10 disposed on a surface of the substrate.

18. The article of claim 16 wherein the substrate is light transmissive.

19. The article of claim 16 wherein the substrate is an inorganic material.

20. A method of making a coating composition comprising providing a mixture comprising:
an organic solvent;
a first alkoxy silane compound having a first organofunctional group;
a second compound having a organofunctional group the reacts with the first organofunctional group forming an organic linking group;
no greater than 40 wt-% solids of alkoxy silane compound that lack organofunctional groups or partial hydrolysis products thereof;
combining the mixture with acid and water wherein the water to alkoxy silane molar ratio is no greater than 7:1; and
hydrolyzing the mixture.

* * * * *

UNITED STATES PATENT AND TRADEMARK OFFICE
CERTIFICATE OF CORRECTION

PATENT NO. : 10,088,603 B2  
APPLICATION NO. : 15/103209  
DATED : October 2, 2018  
INVENTOR(S) : Xuan Jiang et al.

Page 1 of 1

It is certified that error appears in the above-identified patent and that said Letters Patent is hereby corrected as shown below:

In the Specification

<u>Column 2</u>
Line 25, Delete "the" and insert -- that --, therefor.
Line 54, Delete "ethyl;" and insert -- ethyl. --, therefor.

<u>Column 4</u>
Line 9, Delete "aminoprop-yltrimethoxysilane" and insert -- aminopropyltrimethoxysilane --, therefor.

<u>Column 5</u>
Lines 1-2, After "phenyltriethoxysilane" insert -- , --.
Line 18, Delete "(e g" and insert -- (e.g. --, therefor.

<u>Column 11</u>
Line 28, Delete "Tetraethoxyl silane" and insert -- Tetraethoxysilane --, therefor.
Line 38, After "Japan)" insert -- . --.
Line 54, Delete "(Pillipsburg," and insert -- (Philipsburg, --, therefor.

In the Claims

<u>Column 18</u>
Line 27, (Approx.), In Claim 20, delete "the" and insert -- that --, therefor.

Signed and Sealed this
Seventh Day of May, 2019

Andrei Iancu
*Director of the United States Patent and Trademark Office*